2 Sheets—Sheet 1.
F. KUHLMAN.
BARREL GAGE.
No. 188,803. Patented March 27, 1877.
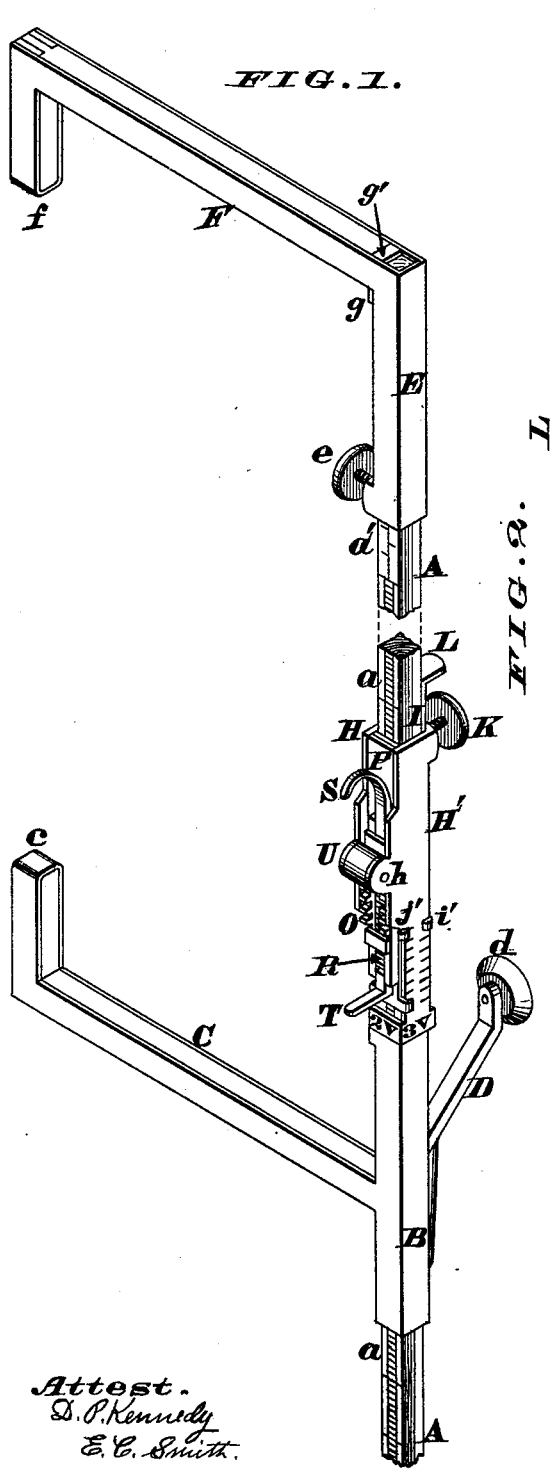
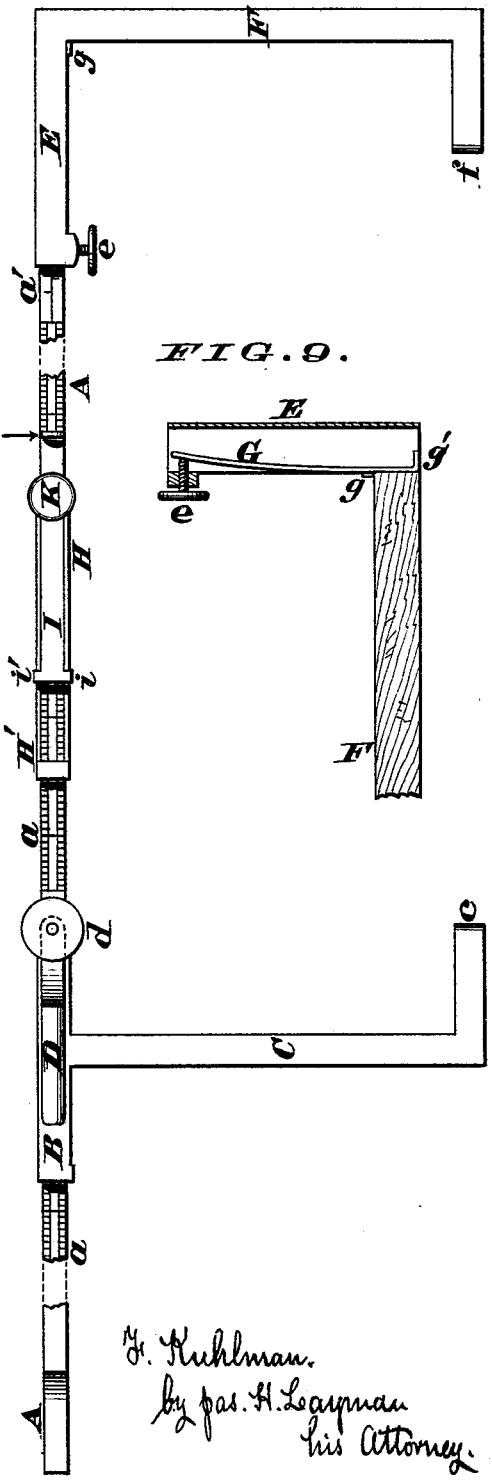
Attest.
D. P. Kennedy
E. C. Smith
F. Kuhlman.
by Jas. H. Layman
his Attorney.

2 Sheets—Sheet 2.
F. KUHLMAN.
BARREL GAGE.
No. 188,803. Patented March 27, 1877.
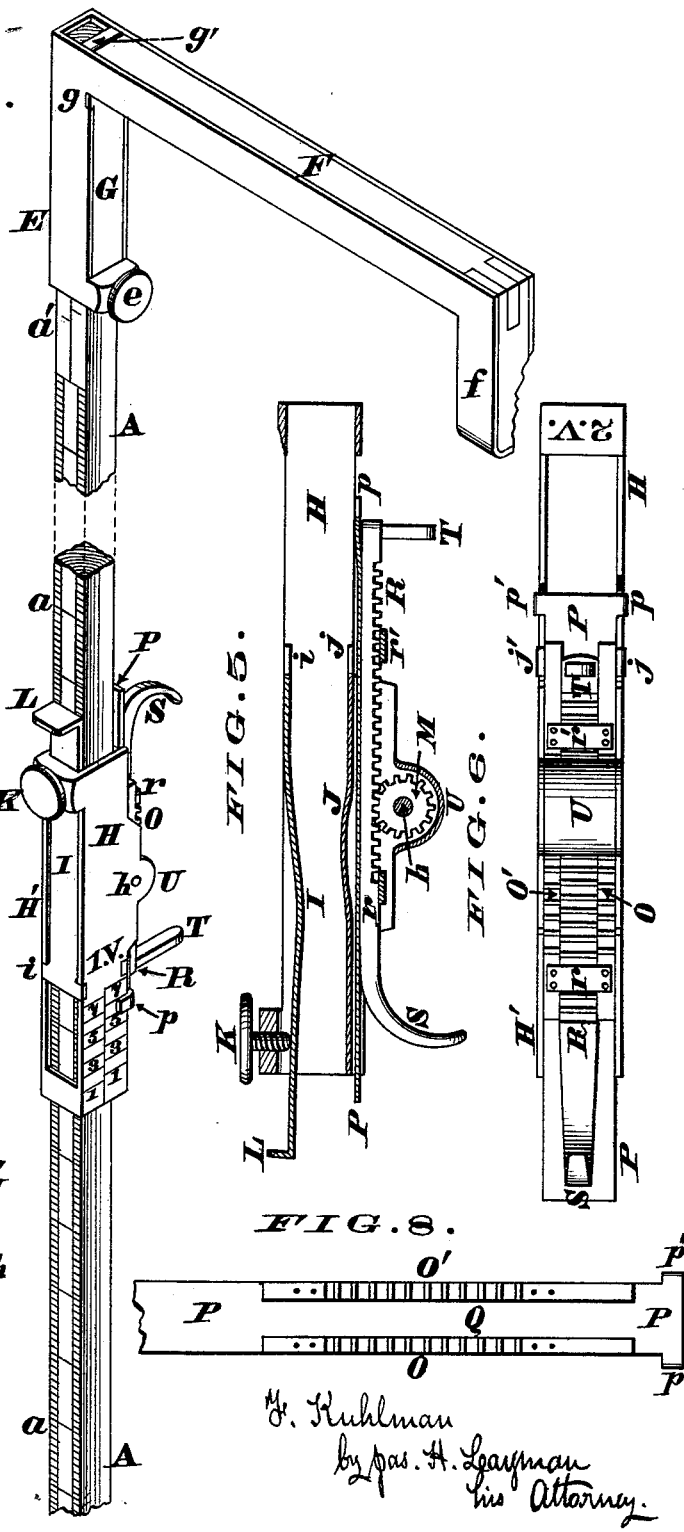
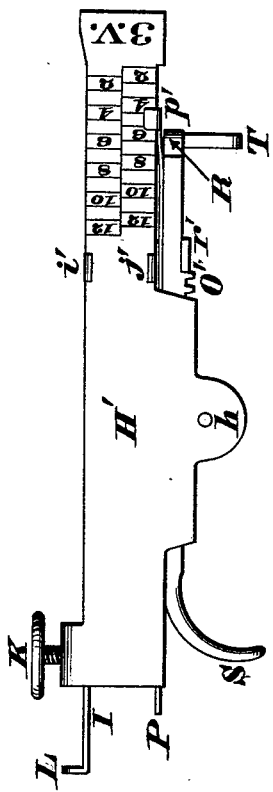
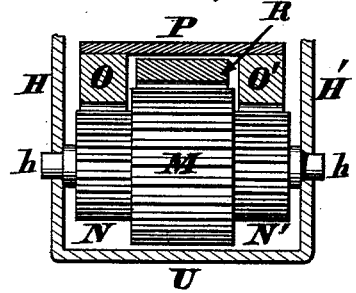
Attest.
D. P. Kennedy.
E. E. Smith.
F. Kuhlman
by Jas. H. Layman
his Attorney.

UNITED STATES PATENT OFFICE.

FRIEDERICH KUHLMAN, OF CINCINNATI, OHIO.

IMPROVEMENT IN BARREL-GAGES.

Specification forming part of Letters Patent No. 188,803, dated March 27, 1877; application filed February 12, 1877.

*To all whom it may concern:*

Be it known that I, FRIEDERICH KUHLMAN, of Cincinnati, Hamilton county, Ohio, have invented certain new and useful Improvements in Barrel-Gages, of which the following is a specification:

This invention relates to that class of devices which are employed for gaging the head and bung measure and length of barrels, kegs, and similar vessels that contain liquor; and the first part of my invention consists in providing the lower caliper with a small disk or wheel, that rolls around against the inner side of the barrel-chine when the head-measure of the vessel is taken. By this arrangement said caliper is rendered capable of performing the twofold purpose of gaging the length of the vessel, and also of assisting in taking the head-measure of the same.

The second part of my invention consists in furnishing the mean-diameter scale with one or more springs, that retain said scale securely upon the gage-rod until it is locked in position with a suitable set-screw. These springs prevent any accidental sliding of the scale along the gage-rod, and thereby insure the utmost accuracy in handling the instrument.

The third part of my invention consists of a peculiar arrangement of pinions and racks for operating the bung-rod of the mean-diameter scale, the details of this arrangement being hereinafter more fully described.

In the annexed drawings, Figure 1 is a perspective view of my improved gage in condition for taking the head-measure of a barrel. Fig. 2 is a side elevation, showing the method of calipering the length of any vessel. Fig. 3 is a perspective view, showing the lower caliper detached from the gage-rod, and the mean-diameter scale set for taking the bung-measure of a barrel. Fig. 4 is a side elevation of the mean-diameter scale detached from the gage-rod. Fig. 5 is a longitudinal section of the same. Fig. 6 is a plan of said scale. Fig. 7 is a section through the racks and pinions of the same. Fig. 8 is a plan of the double rack detached from the mean-diameter scale. Fig. 9 is a section through the sheath of the upper caliper.

A represents the gage-rod of the device, which rod is of the customary length, and is furnished with the usual scales $a$, that are divided into inches and tenths of inches. Furthermore, this rod is provided with the usual wantage-scales $a'$. Adapted to slide freely along this rod is a sheath or socket, B, from which projects rigidly and at right angles an arm, C, of any suitable length. This arm terminates with a right-angled projection, $c$, and said arm C $c$, together with its sheath B, constitutes the lower caliper of my gage. Attached to sheath B is a bracket, D, having journaled in it a small disk, or wheel, or roller, $d$, adapted to bear against the inner side of the barrel-chine when the head-measure is being taken.

The upper caliper of the gage consists of a sheath, E, an arm, F, and a right-angled projection, $f$, which arm and projection or termination are essentially the same as the ones C $c$ previously described.

One side of sheath E consists of a yielding plate, G, secured to said sheath at $g$, and terminating in a flange, $g'$, that serves as a stop to limit the entrance of gage-rod A. (See Figs. 1, 3, and 9.)

A set-screw, $e$, couples the upper caliper E F $f$ to the main gage-rod.

The mean-diameter scale consists of a box having two rigid side plates, H H', and two inwardly-bent elastic plates, I J, which latter are attached to the former at $i$ $i'$ and $j$ $j'$, respectively. These bent plates I J serve as springs to retain the box H H' and its accessories upon gage-rod A until said box is more securely attached thereto with set-screw K.

The projecting end of plate I has the shape of a lip, L, which lip is employed in the usual manner for finding the "wantage" of a barrel.

Journaled in side plates H H' is a shaft, $h$, carrying three pinions, M N N', of which the former is armed with one hundred teeth and the two latter each with sixty-three. But if these pinions should not be large enough to afford so many teeth, their diameters must be of the relative proportions above described.

Furthermore, these three pinions M N N' must all be arranged so as to rotate in unison with each other, either by keying them to shaft $h$ or otherwise.

The two outer and smaller pinions N N', having each sixty-three teeth, gear with two parallel racks, O O', secured to a flat plate, P, having at its lower end lips $p$ $p'$, which serve as pointers along the scales 1 V and 2 V of side plates H H'. The intermediate and larger pinion M, having one hundred teeth, engages with a central rack, R, occupying the race or channel Q between the other racks, O O', and said member R of the mean-diameter scale is furnished at its upper end with a hook or handle, S, of any convenient shape, while the lower end of said central rack carries the bung-rod T.

Bars $r$ $r'$ retain rack R within the race Q, the ends of said bars being attached to racks O O'. U is a semi-cylinder, within which the pinions are housed.

The method of adjusting and using my gage is as follows:

The upper caliper E F $f$ is first slid onto shaft A as far as stop $g'$ will permit, and said caliper is then secured in its proper position with screw $e$. The mean-diameter scale is applied to said shaft or rod in such a manner as to bring plate H on the same side of this rod as is screw $e$, after which the lower caliper B C $c$ is placed in position.

This caliper is slid onto the gage-rod until the upper end of sheath B comes in contact with the mean-diameter scale H H', care being taken to have the caliper-arms C F in the same plane, as seen in Fig. 1.

The gager then rests the pointed end of rod A upon the inner side or periphery of the barrel-chine, and brings the roller $d$ in contact with the opposite periphery or inner side of said chine. The head-measure is then taken in the usual manner, the roller $d$ being forced against the chine of the barrel, so as to obtain the largest diameter of the latter. As this roller recedes from the point of rod A the mean-diameter scale H H' is elevated accordingly, and, owing to the clamping action of springs I J, said scale cannot slide down the rod in case the roller $d$ should come in contact with a projection or any other irregularity in the barrel-chine. It will thus be seen that the roller causes the mean-diameter scale to indicate only the largest diameter of the head, the scale H H' being securely retained in its most elevated position by the aforesaid springs until locked to rod A by screw K.

The largest diameter of the head having been obtained in this manner, and the scale H H' securely fastened to the gage-rod, the lower caliper B C $c$ is then shifted toward the point of said rod, and the terminations $c$ $f$ employed for gaging the length of the barrel, as seen in Fig. 2.

As the roller attachment D $d$ is not in the same plane as caliper-arms C $c$ F $f$, this act of measuring the length of a barrel or other receptacle is accomplished without any inconvenience resulting from the use of said attachments.

The lower caliper B C $c$ is now removed, and rod A inserted at the bung-hole of the barrel, after which hook S is drawn up until rod T comes in contact with the inner side of one of the upper staves of the barrel, it being understood that the normal position of said rod is at the lower end of box H H', as seen in Fig. 1.

The position of said rod T when elevated so as to take the bung-measure of any barrel or keg is shown in Fig. 3.

If the barrel measured should be of the first variety, the gager notices where the pointer $p$ of plate P is located on the right column of figures composing the first-variety scale—marked 1 V in the drawings. He then reads across to the corresponding number in the left column of figures in said scale, after which rod A is turned far enough to the right to see what position this last-found numeral bears with reference to the decimal scale $a$, and such indication shows at once the mean diameter of a barrel of the first variety. (See Fig. 3.)

But if the barrel should be of the second variety, no turning of rod A is necessary, as the location of the lower end of plate P along the scale $a$ indicates at once the mean diameter of such a barrel, as seen in Fig. 1. In this illustration the second variety-scale is marked 2 V.

The third-variety scale is shown at 3 V in Fig. 4, and it is read off precisely like the first-variety scale, with this exception, that in observing the third variety, rod A is turned to the left.

The upper caliper E F $f$ having been unshipped from rod A, the wantage of the barrel is obtained, in the usual manner, with the lip L and scales $a'$, and the capacity of the vessel is then calculated from the Government tables.

When my gage is constructed exclusively for measuring barrels of the second variety, the pointers $p$ $p'$ and scales 1 V and 3 V may be omitted, and I reserve the right of thus modifying the invention.

I claim as my invention—

1. In a barrel-gage, the combination of adjustable caliper B C $c$ and chine-roller D $d$, when adapted for use with rod A, substantially as herein described, and for the purpose set forth.

2. The combination, with mean-diameter scale H H', of one or more springs, I J, for retaining said adjustable scale upon the gage-rod A, substantially as herein described, and for the purpose set forth.

3. In combination with mean-diameter scale H H', the shaft $h$, pinions M N N', racks O O' P R, hook S, and bung-rod T, said pinions M and N N' having the relative proportions to each other substantially as herein described, and for the purpose set forth.

4. In combination with mean-diameter scale H H' h, pinions M N N', racks O O' P R, hook S, and bung-rod T, the pointers p p', substantially as herein described, and for the purpose set forth.

In testimony of which invention I hereunto set my hand.

FRIEDERICH KUHLMAN.

Witnesses:
   JAMES H. LAYMAN,
   S. B. SPEAR.